(12) United States Patent
Sawada

(10) Patent No.: US 8,333,427 B2
(45) Date of Patent: Dec. 18, 2012

(54) ROOF APPARATUS

(75) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/067,194

(22) Filed: May 16, 2011

(65) Prior Publication Data

US 2012/0068502 A1 Mar. 22, 2012

(30) Foreign Application Priority Data

Sep. 17, 2010 (JP) .................................. 2010-209948

(51) Int. Cl.
*B60J 7/00* (2006.01)
(52) U.S. Cl. .................................................. 296/216.08
(58) Field of Classification Search ...... 296/216.01–224
See application file for complete search history.

(56) References Cited

U.S. PATENT DOCUMENTS

| | | | |
|---|---|---|---|
| 2,208,712 A | * | 7/1940 | Votypka .......................... 296/222 |
| 4,418,956 A | | 12/1983 | Yamamoto |
| 4,720,138 A | * | 1/1988 | Schlapp et al. ................ 296/222 |
| 4,765,677 A | | 8/1988 | Nagata |
| 4,783,117 A | | 11/1988 | Nagata |
| 5,039,161 A | * | 8/1991 | Schmidhuber et al. ........ 296/212 |
| 6,293,619 B1 | | 9/2001 | Iimori et al. |

FOREIGN PATENT DOCUMENTS

JP 07-117582 5/1995

* cited by examiner

*Primary Examiner* — Dennis Pedder
(74) *Attorney, Agent, or Firm* — Finnegan, Henderson, Farabow, Garrett & Dunner, LLP (57) ABSTRACT

A roof apparatus includes a movable panel for opening and closing an opening portion adapted to be provided on a roof panel, and a weather strip disposed between an opening edge of the roof panel and the movable panel so as to serve as a sealing between the opening edge and the movable panel. The opening edge of the roof panel includes a flange portion formed to extend vertically downward from a roof panel body of the roof panel. The weather strip includes a base portion accommodating the flange portion of the roof panel inside the base portion. A supporting member mounted on the roof panel and supporting the movable panel includes a holding portion holding the base portion of the weather strip.

12 Claims, 6 Drawing Sheets

ROOF APPARATUS

CROSS REFERENCE TO RELATED APPLICATIONS

This application is based on and claims priority under 35 U.S.C. §119 to Japanese Patent Application 2010-209948, filed on Sep. 17, 2010, the entire content of which is incorporated herein by reference.

TECHNICAL FIELD

This disclosure generally relates to a roof apparatus.

BACKGROUND DISCUSSION

A known roof apparatus is disclosed in JPH7-117582A (hereinafter referred to as Patent reference 1).

Figure 6:
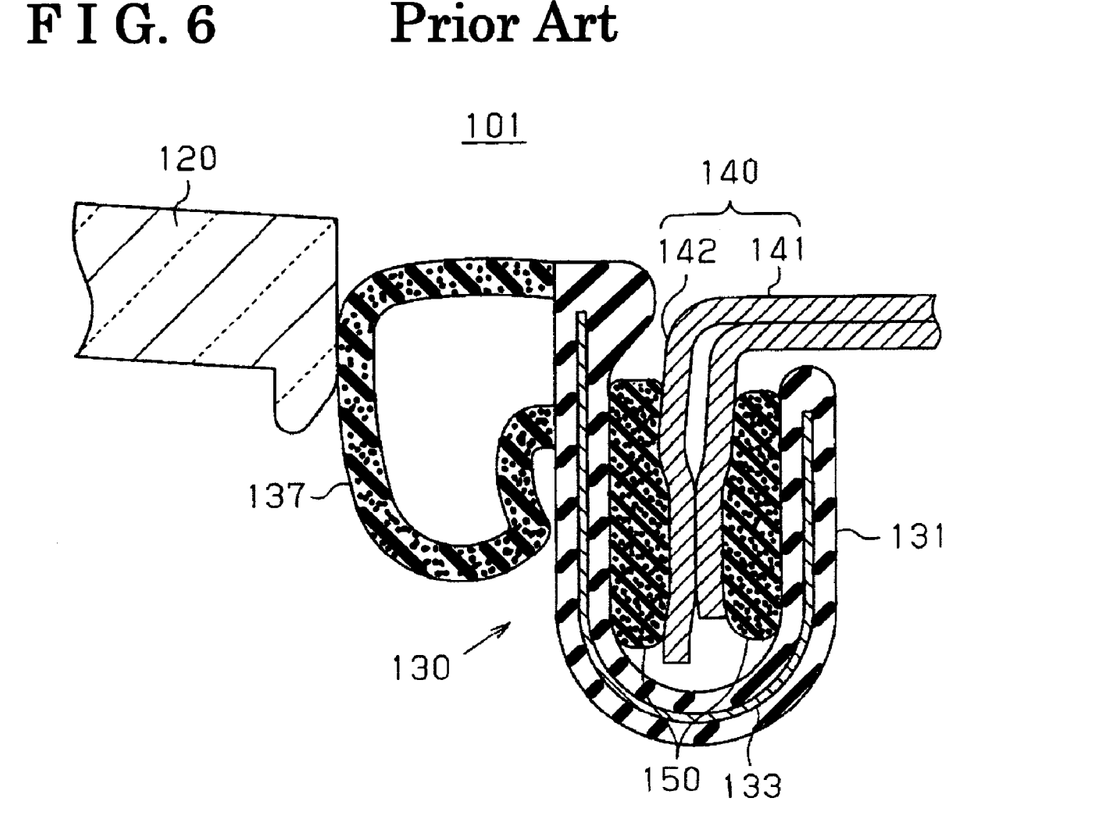
FIG. 6 is a diagram illustrating a cross section structure of, in particular, a weather strip of a known roof apparatus.

Illustrated in FIG. 6 is a configuration example of the known roof apparatus according to the Patent reference 1. As shown in FIG. 6, the roof apparatus 101 disclosed in Patent reference 1 includes a movable panel 120 for opening and closing an opening portion of a roof panel 140, and a weather strip 130 provided between an opening edge of the roof panel 140 and the movable panel 120 so as to serve as a sealing between the opening edge and the movable panel 120. The opening edge of the roof panel 140 is defined by an outer surface (a surface facing the left side in FIG. 6) of a flange portion 142 that extends vertically downward from a roof panel body 141. The weather strip 130 includes a trim portion 131 and a seal portion 137. The trim portion 131 has a substantially U-shaped cross section and includes a core 133 embedded into an inside of the trim portion 131. The seal portion 137 having a hollow configuration so as to be expanded from an outer surface of the trim portion 131. In order to assemble the weather strip 131 on the roof panel 140, the trim portion 131 is clamped by using a jig so that an opening of the trim portion 131 is narrowed, in a state where the flange portion 142 is accommodated inside of the trim portion 131. According to Patent reference 1, a sponge member 150 is provided at an inner surface of the trim portion 131 and an inner surface of the sponge member 150 is in a pressure contact with the flange portion 141.

According to the known roof apparatus 101 disclosed in Patent reference 1, the inner surface of the trim portion 131, more specifically, the sponge member 150, press-fittingly contacts with the flange portion 142 by clamping the trim portion 131 of the weather strip 130, and thus the weather strip 130 is assembled on the flange portion 142. However, once the opening of the trim portion 131 is enlarged due to an application of some force or due to other causes, an assembly state of the weather strip 130 may become unstable, which may decrease a sealing performance of the weather strip 130. Therefore, there remains room for improving a reliability of the weather strip of the known roof apparatus disclosed Patent reference 1

A need thus exists for a roof apparatus which is not susceptible to the drawback mentioned above.

SUMMARY

According to an aspect of this disclosure, a roof apparatus includes a movable panel for opening and closing an opening portion adapted to be provided on a roof panel, and a weather strip disposed between an opening edge of the roof panel and the movable panel so as to serve as a sealing between the opening edge and the movable panel. The opening edge of the roof panel includes a flange portion formed to extend vertically downward from a roof panel body of the roof panel. The weather strip includes a base portion accommodating the flange portion of the roof panel inside the base portion. A supporting member mounted on the roof panel and supporting the movable panel includes a holding portion holding the base portion of the weather strip.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of a roof apparatus related to this disclosure will be explained with reference to illustrations of FIGS. 1 to 5 of the attached drawings. In this embodiment, the roof apparatus is adapted as an on-vehicle roof apparatus (hereinafter referred to as "a roof apparatus 1"). Hereinafter, a front/rear direction of a vehicle is referred to as "a front/rear direction" and a vertical direction is referred to as "a upper/lower direction". An "inner side" refers to a side that is closer to the center of the roof apparatus 1 in a width direction of the vehicle and an "outer side" refers to a side that is away from the center of the roof apparatus 1 in the width direction of the vehicle.

Figure 1:
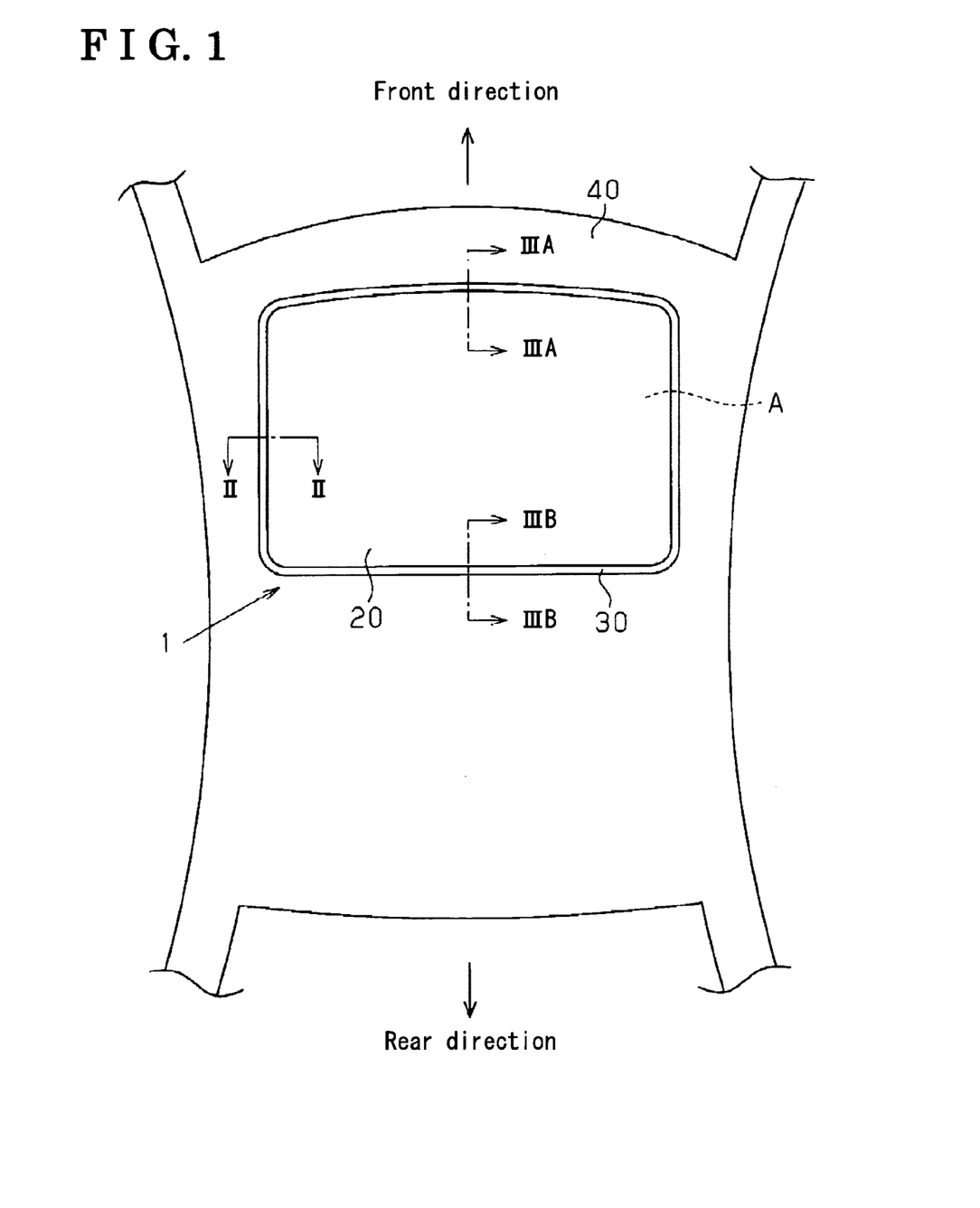
FIG. 1 is a diagram illustrating a plane structure of, in particular, a roof panel of a vehicle on which a roof apparatus according to a first embodiment disclosed here is mounted.

As shown in FIG. 1, the roof apparatus 1 is configured so as to open and close an opening portion A formed at a roof panel 40 of a vehicle on which the roof apparatus 1 is mounted. The roof apparatus 1 includes a movable panel 20 for opening and closing the opening portion A by moving in the front/rear direction, and a weather strip 30 which is provided between an opening edge of the roof panel 40 and the movable panel 20 so as to serve as a sealing between the opening edge and the movable panel 20.

A cross section structure of the roof apparatus 1 will be explained below with reference to FIGS. 2, 3A and 3B.

Figure 2:
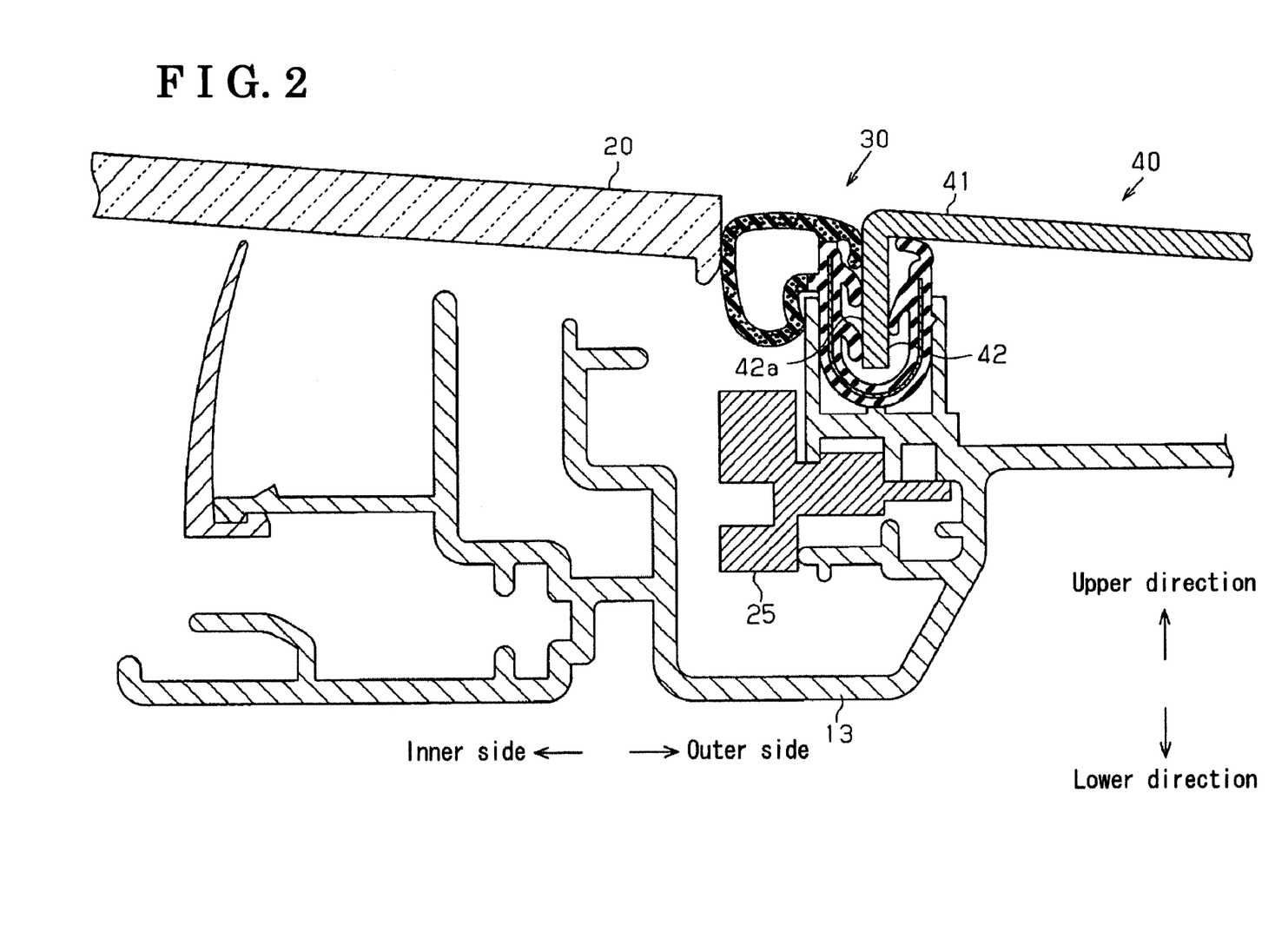
FIG. 2 is a cross section view which is taken along line II-II in FIG. 1 and illustrates a cross section structure of the roof apparatus according to the first embodiment disclosed here.
Figure 3A:
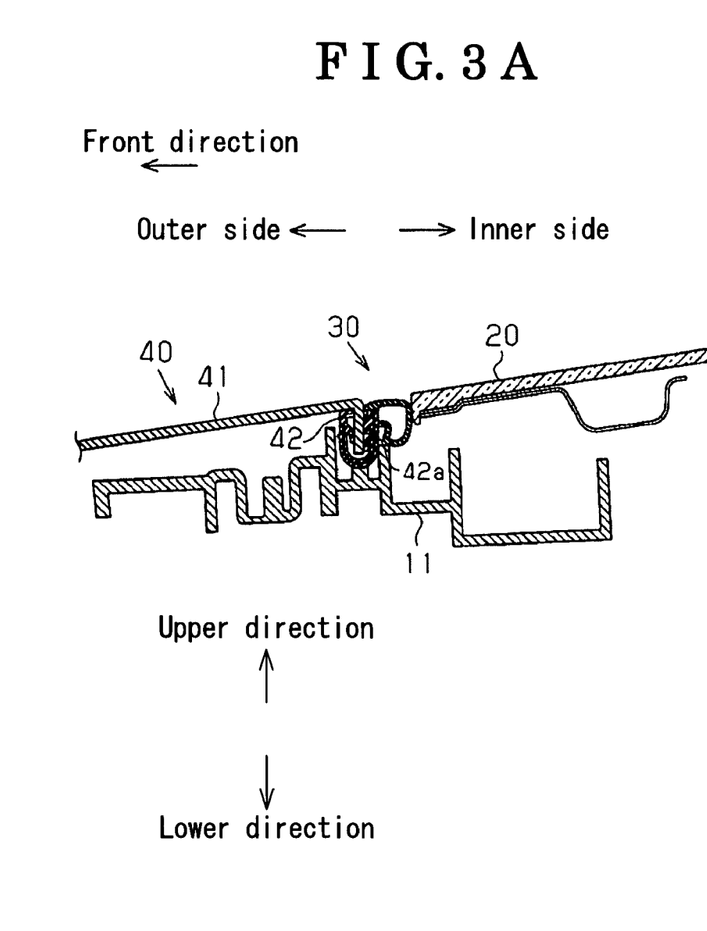
FIG. 3A is a cross section view which is taken along line IIIA-IIIA in FIG. 1 and illustrates the cross section structure of the roof apparatus according to the first embodiment disclosed here.
Figure 3B:
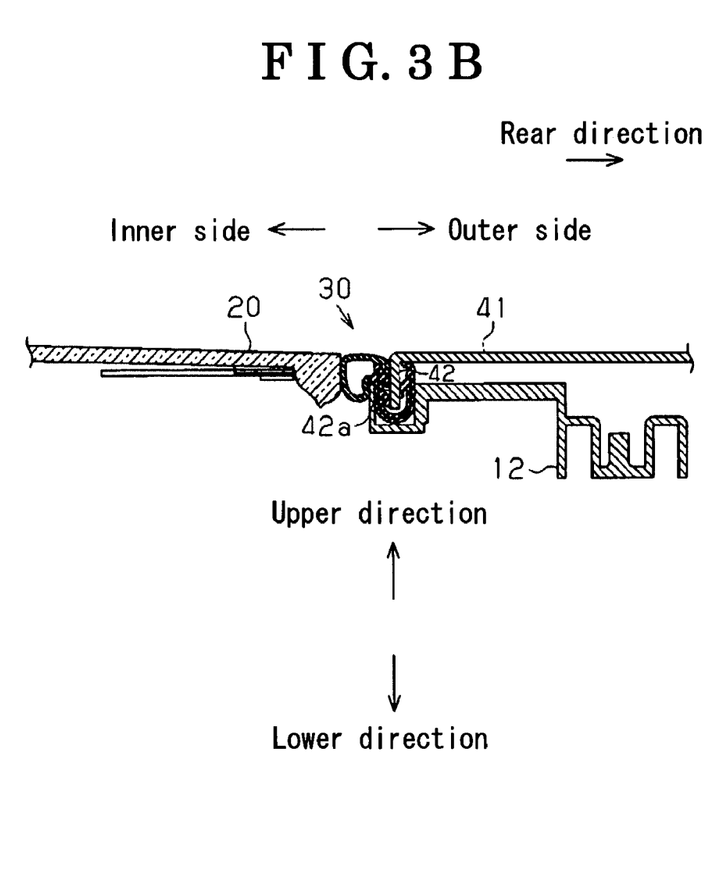
FIG. 3B is a cross section view which is taken along line IIIB-IIIB in FIG. 1 and illustrates the cross section structure of the roof apparatus according to the first embodiment disclosed here.

As shown in FIGS. 2, 3A and 3B, the roof panel 40 includes a roof panel body 41 formed into a substantially plane shape and a flange portion 42 formed so as to extend downward from an end portion of the roof panel body 41 located closer to the opening portion A. An outer surface 42a of the flange portion 42, that is, the surface facing the movable panel 20, serves as the opening edge of the roof panel 40.

As shown in FIG. 2, a guide rail 13 is provided below a right hand end portion of the movable panel 20 and below the roof panel 40 so as to extend in a direction of an opening and closing operation of the movable panel 20, that is, in the front/rear direction of the vehicle. Also, a guide rail mating the above-mentioned guide rail 13 is provided below a left hand end portion of the movable panel 20 and below the roof panel 40 so as to extend in the direction of the opening and closing operation of the movable panel 20, that is, in the front/rear direction of the vehicle. The pair of guide rails 13, 13 supports a pair of respective movable members 25, 25 connected to the movable panel 20 so as to drive and move the movable panel 20 for opening and closing the opening portion A in a manner that the pair of the movable members 25, 25 moves relative to the pair of the respective guide rails 13, 13.

As shown in FIG. 3A, a front housing 11 is provided below a front end portion of the movable panel 20 and below the roof panel 40 so as to extend in a direction perpendicular to the direction of the opening and closing operation of the movable panel 20, that is, in the width direction of the vehicle.

As shown in FIG. 3B, a rear housing 12 is provided below a rear end portion of the movable panel 20 and below the roof panel 40 so as to extend in the direction perpendicular to the direction of the opening and closing operation of the movable panel 20, that is, in the width direction of the vehicle. The guide rails 13, 13, the front housing 11 and the rear housing 12 may be made of metal, resin or other material while maintaining a necessary rigidity.

The pair of guide rails 13, 13 is formed to be longer than a length from a front end portion to a rear end portion of the flange portion 42 so that the pair of guide rails 13, 13 extends below the entire flange portion 42 at least in the front/rear direction. The pair of guide rails 13, 13 is fixedly mounted on the roof panel 40.

Each of the front housing 11 and the rear housing 12 is formed to be longer than a length from a left hand end portion to a right hand end portion of the flange portion 42 so that each of the front housing 11 and the rear housing 12 extends below the entire flange portion 42 at least in the width direction of the vehicle. The front housing 11 and the rear housing 12 are fixedly mounted on the roof panel 40.

As shown in FIGS. 2, 3A and 3B, the weather strip 30 is assembled on the flange portion 42 of the roof panel 40 and, as will be explained later, is assembled on the guide rail 13, the front housing 11 and the rear housing 12.

The guide rail 13, the front housing 11 and the rear housing 12 serve as a supporting member. The structure of the weather strip 30 according to this embodiment and an assembly structure of the weather strip 30 are not influenced by an assembly target, i.e. the guide rail 13, the front housing 11 or the rear housing 12, on which the weather strip 30 is assembled. In other words, the structure of the weather strip 30 and the assembly structure of the weather strip 30 do not need to be modified or changed depending on the assembly target.

The weather strip 30 and the assembly structure thereof in the case where the weather strip 30 is assembled on the guide rail 13 will be explained in detail as an example with reference to FIGS. 4 and 5. The explanation in the case where the weather strip 30 is assembled on the front housing 11 or on the rear housing 12 is omitted.

Figure 5:
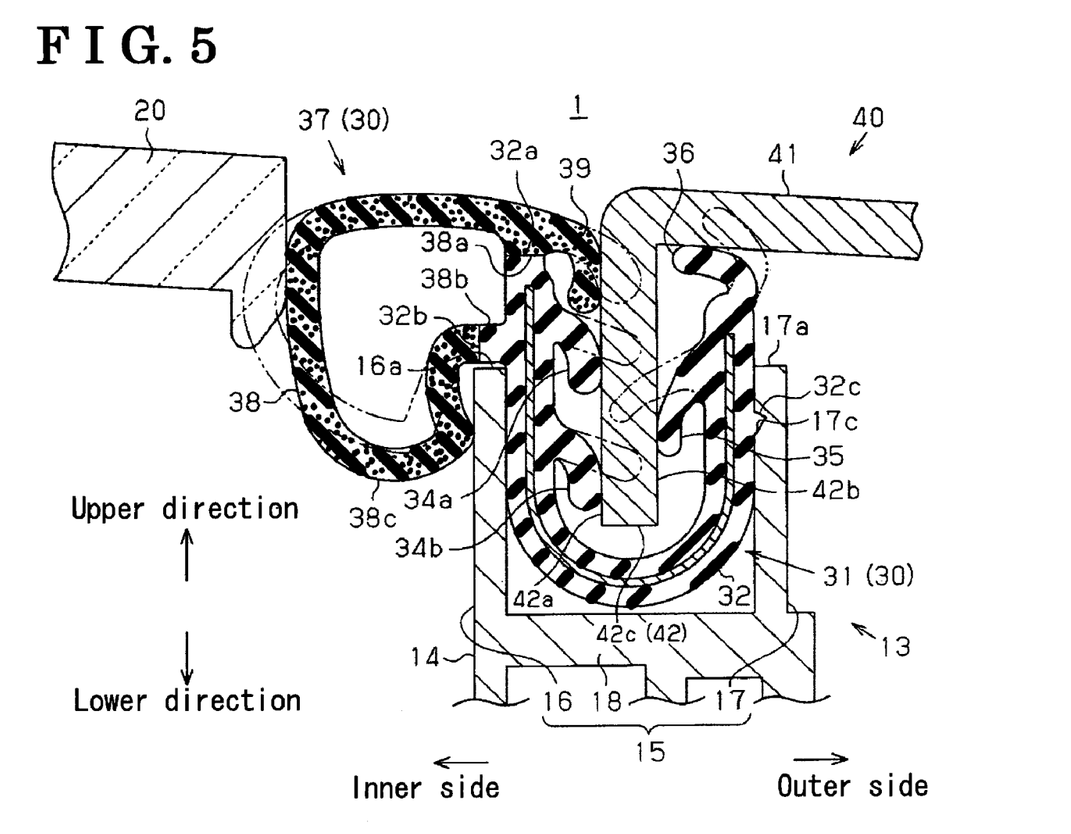
FIG. 5 is a diagram illustrating a cross section structure of, in particular, the weather strip that is assembled on a roof panel and on a guide rail of the roof apparatus according to the first embodiment disclosed here.

In FIG. 5, a solid line shows the weather strip 30 that is assembled on the guide rail 13 and a chain double-dashed line shows the weather strip 30 before being assembled on the guide rail 13.

Figure 4:
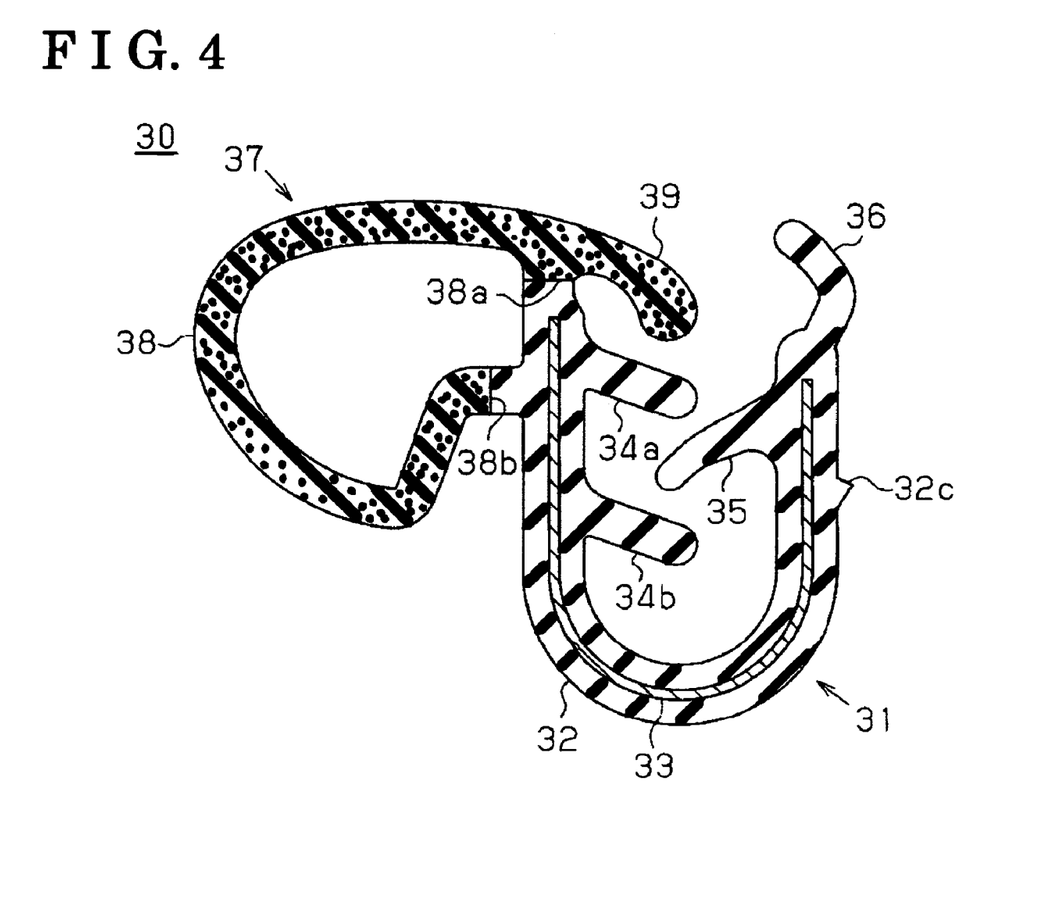
FIG. 4 is a cross section view illustrating a cross section structure of a weather strip according to the first embodiment disclosed here.

As shown in FIG. 4, the weather strip 30 includes a base portion 31 and a sealing portion 37 formed integrally with the base portion 31. The base portion 31 having a substantially U-shaped cross section includes a base body 32, a core 33, plural protrusions (a first inner-side protrusion 34a, a second inner-side protrusion 34b, and an outer-side protrusion 35) and an upper protrusion 36. The first and second inner-side protrusions 34a, 34b serve as inner-side protrusions. The sealing portion 37 is connected to a first end of the base body 32 (the upper left end of the base body 32 in FIG. 4). The core 33 has a substantially U-shaped cross section and is embedded into an inside of the base body 32. Each of the plural protrusions (the first and second inner-side protrusions 34a, 34b, and the outer-side protrusion 35) protrudes diagonally downward from an inner surface of the base body 32. The upper protrusion 36 is formed at a second end of the base body 32 (the upper right end of the base body 32 in FIG. 4).

The sealing portion 37 has a substantially C-shaped cross section and includes a sealing portion body 38 and an extending portion 39. End portions (an upper connecting portion 38a and an inner-side connecting portion 38b) of the sealing portion body 38 are connected to the first end of the base body 32. The extending portion 39 is formed at an upper portion of the sealing portion body 38. An inner surface of the sealing portion body 38 and an outer surface of the base body 32 define an internal hollow space, and thus the weather strip 30 is formed to have a hollow configuration.

In this embodiment, the base portion 31 of the weather strip 30 is made of a solid rubber, on the contrary, the sealing portion 37 is made of a foam rubber. Additionally the base portion 31 and the sealing portion 37 are made of an identical material. In other words, the base portion 31 and the sealing portion 37, both of which constitute the weather strip 30, are made in a dual molding process. In this embodiment, ethylene propylene diene monomer rubber (EPDM) is used as a material of the base portion 31 and the sealing portion 37.

As shown in FIG. 5, a holding portion 15, which includes an inner-side vertical wall portion 16, an outer-side vertical wall portion 17 and a bottom portion 18, is connected to a guide rail body 14. The inner-side vertical wall portion 16 is formed into a substantially plate shape extending upward and is positioned inwardly of the flange portion 42, that is, closer to the center of the roof apparatus 1 relative to the flange portion 42. The outer-side vertical wall portion 17 is formed into a substantially plate shape extending upward and is positioned outwardly of the flange portion 42, that is, away from the center of the roof apparatus 1 relative to the flange portion 42. The inner-side vertical wall portion 16 and the outer-side vertical wall portion 17 serve as vertical wall portions. The bottom portion 18 is positioned below the inner-side and outer-side vertical wall portions 16, 17 so as to extend in a substantially horizontal direction. The inner-side vertical wall portion 16 and the outer-side vertical wall portion 17 are connected to end portion of the bottom portion 18, respectively. An upper end portion 16a of the inner-side vertical wall portion 16 and an upper end portion 17a of the outer-side vertical wall portion 17 are positioned at a substantially identical height to each other in the vertical direction. The upper end portion 16a and the upper end portion 17a serve as a second portion. A lower end portion 42c of the flange portion 42 is positioned lower than the upper end portion 16a of the inner-side vertical wall portion 16 and the upper end portion 17a of the outer-side vertical wall portion 17. The bottom portion 18 serves as a portion of the guide rail body 14.

The base portion 31 of the weather strip 30 is positioned between an inner surface of the inner-side vertical wall portion 16 and the flange portion 42, and between an inner surface of the outer-side vertical wall portion 17 and the flange portion 42. The inner surfaces of the inner-side and outer-side vertical wall portions 16, 17 and an outer surface of the base portion 31 are in pressure contact with each other. In other words, the base portion 31 receives the flange portion 42 from an opening of the U-shaped configuration of the base portion 31 so that the base portion 31 accommodates or contains, that is, embraces therein the flange portion 42 of the roof panel 40. That is, the flange portion 42 is surrounded by the base portion 31 from below and in the width direction of the vehicle. At the same time, the holding portion 15 holds the base portion 31 of the weather strip 30 in a manner that the base portion 31 is sandwiched by the inner-side vertical wall portion 16 and the outer-side vertical wall portion 17. The bottom portion 18 may support the base portion 31 as shown in FIG. 2.

A cut-out portion 17c formed on an inner surface of the outer-side vertical wall portion 17 receives therein a projection 32c formed on the outer surface of the base body 32 so as to project from the outer surface of the base body 32 so that the projection 32c is fittedly engaged with the cut-out portion 17c. The cut-out portion 17c serves as a receiving member and the projection 32c serves as a fitting member. The first and second inner-side protrusions 34a and 34b are formed on the inner surface, which faces the outer surface 42a of the flange portion 42, of the base portion 31 in a manner that the first and second inner-side protrusions 34a and 34b are separated from each other in the vertical direction. The first inner-side protrusion 34a formed above the second inner-side protrusion 34b is positioned higher than the upper end portion 16a of the inner-side vertical wall portion 16 and the inner-side protrusion 34b formed below the first inner-side protrusion 34a is positioned lower than the upper end portion 16a. The first and second inner-side protrusions 34a and 34b have an identical length to each other in protruding directions. Furthermore, the length of the first and second inner-side protrusions 34a and 34b is shorter than a length of the outer-side protrusion 35 in the protruding directions. The outer-side protrusion 35 is formed on the inner surface, which faces an inner surface 42b of the flange portion 42, of the base portion 31. Specifically, the outer-side protrusion 35 is formed to be positioned lower than the first inner-side protrusion 34a, which is positioned higher than the inner-side protrusion 34b, and is formed higher than the inner-side protrusion 34b, which is positioned lower than the first inner-side protrusion 34a. In other words, the outer-side protrusion 35 is positioned between the first and second inner-side protrusions 34a and 34b in the vertical direction. As shown by the solid line in FIG. 5, upper surfaces of the first and second inner-side protrusions 34a and 34b are in pressure contact with the outer surface 42a of the flange portion 42. An upper surface of the outer-side protrusion 35 is in pressure contact with the inner surface 42b of the flange portion 42. The upper protrusion 36 is provided at the second end of the base portion 31, specifically, at the end portion that is positioned between the flange portion 42 and the outer-side vertical wall portion 17. An upper surface of the upper protrusion 36 is in pressure contact with an inner surface of the roof panel body 41 as shown by the solid line in FIG. 5. The upper surfaces of the first and second inner-side protrusions 34a and 34b and the upper protrusion 36 refer to the surfaces facing upward before the weather strip 30 is assembled on the flange portion 42 of the roof panel 40.

The inside of the base portion 31, that is, a clearance formed between the lower end portion 42c of the flange portion 42 and an inner surface facing the lower end portion 42c, of the base portion 31, is filled with a sealing agent. The sealing portion 37 is configured so that an outer surface, in particular, a side surface facing the movable panel 20, of the sealing portion body 38 is in contact with the movable panel 20 at least when the movable panel 20 is in a fully closed position.

The sealing portion body 38 is positioned between the movable panel 20 and the base portion 31. The upper connecting portion 38a, which is one end portion of the sealing portion body 38, is connected to an inner-side upper end portion 32a of the base body 32. The inner-side connecting portion 38b, which is the other end portion of the sealing portion body 38, is connected to an inner-side projection 32b protruding from a side surface of the base body 32 toward an upper surface of the upper end portion 16a of the inner-side vertical wall portion 16 so as to be located above the upper surface of the upper end portion 16a of the inner-side vertical wall portion 16 while keeping a clearance therefrom in the vertical direction. As shown by the solid line and the chain double-dashed line in FIG. 5, the sealing portion body 38 is formed in a manner that a lowermost end portion 38c, which is the lowest portion of the sealing portion body 38, is positioned lower than the upper end portion 16a of the inner-side vertical wall portion 16. The lowermost end portion 38c serves as a first portion. As shown by the full line in FIG. 5, the sealing portion body 38 is in pressure contact with the inner-side vertical wall portion 16 at one portion that is included in an area from the lowermost end portion 38c to the inner-side connecting portion 38b. As described before, the projection 32c formed on the outer surface of the base body 32 fits in the cut-out portion 17c formed on the inner surface of the outer-side vertical wall portion 17. Thus, the holding portion 15 holds the base portion 31 of the weather strip 30 in a secure manner.

The extending portion 39 extends from the upper connecting portion 38a of the sealing portion body 38 outwardly in a manner that an upper surface of the extending portion 39 is in pressure contact with the outer surface 42a of the flange portion 42 as shown by the solid in FIG. 5. The upper surface of the extending portion 39 is referred to as the surface facing upward before the weather strip 30 is assembled on the flange portion 42 of the roof panel 40. Thus, the sealing portion 37 of the weather strip 30 is positioned between the outer surface 42a of the flange portion 42 of the roof panel 40 and the movable panel 20, and higher than the base portion 31 of the weather strip 30.

The above-explained roof apparatus 1 is assembled on the roof panel 40 in the following manner. First, the base portion 31 of the weather strip 30 is fitted into the holding portion 15 so that an outer surface of the base portion 31 and an inner surface of the holding portion 15 (the inner-side vertical wall portion 16 and the outer-side vertical wall portion 17) are in pressure contact with each other. In the state where the weather strip 30 is assembled on the front housing 11, the rear housing 12 and the guide rail 13, the inside of the base portion 31 is filled with the sealing agent. Then, the flange portion 42 is inserted and fitted into the inside of the base portion 31 from an opening of the base portion 31.

As explained above, according to this embodiment, the following advantages and merits may be obtained. According to this embodiment, the weather strip 30 includes the base portion 31 that accommodates therein the flange portion 42 of the roof panel 40. The front housing 11, the rear housing 12 and the guide rail 13 which are mounted on the roof panel 40 and support the movable panel 20, are provided with the holding portion 15 that holds the base portion 31 of the weather strip 30. According to the above described structure, the weather strip 30 is assembled in the state where the base portion 31 accommodates therein the flange portion 42 of the roof panel 40 and where the weather strip 30 is held inside the holding portion 15 provided at the front housing 11, the rear housing 12 and the guide rail 18. Thus, unlike a structure, where for example, a flange portion of a roof panel is simply sandwiched by a base portion, the weather strip 30 is securely held by the holding portion 15 after being assembled. Consequently, reliability of the weather strip 30 may be improved in the case where the weather strip 30 is adapted to the outer surface 42a of the roof panel 40 including the flange 42 that extends from the roof panel body 41 downward in the vertical direction.

According to this embodiment, the outer surface of the base portion 31 of the weather strip 30 is in pressure contact with the inner surface of the holding portion 15 (the inner-side vertical wall portion 16 and the outer-side vertical wall portion 17). According to the above described structure, the weather strip 30 is securely held by the holding portion 15 after being assembled. In addition, the outer surface of the base portion 31 of the weather strip 30 is in pressure contact with the inner surface of the holding portion 15, and thus a sealing effect between the outer surface of the base portion 31 and the inner surface of the holding portion 15 may be improved.

According to this embodiment, the protrusions (the first inner-side protrusion 34a, the second inner-side protrusion 34b, and the outer-side protrusion 35), each of which protrudes toward the flange portion 42 of the roof panel 40 are formed on the inner surface of the base portion 31 of the weather strip 30 so as to be in contact with the flange portion 42. According to the above described structure, a sealing effect between the inner surface of the base portion 31 and the flange portion 42 may be improved by maintaining the protrusions 34a, 34b and 35 in contact (pressure contact) with the flange portion 42 of the roof panel 40.

According to this embodiment, the upper protrusion 36 protruding toward the inner surface of the roof panel body 41 so as to be in contact with the inner surface of the roof panel 41 is provided at the base portion 31 of the weather strip 30. According to the above described structure, a sealing effect between the base portion 31 and the inner surface of the roof panel body 41 may be improved by maintaining the upper protrusion 36 in contact (pressure contact) with the inner surface of the roof panel body 41.

According to this embodiment, the weather strip 30 includes the sealing portion 37 having the hollow configuration which is formed integrally with the base portion 31 and is in contact with the movable panel 20 at least when the movable panel 20 is in the fully closed position. In addition, the lowermost end portion 38c, which is the lowest portion of the sealing portion 37 in the vertical direction, is positioned lower than the upper end portion 16a, which is the highest portion of the inner-side vertical wall portion 16 in the vertical direction. According to the above described structure, the upper end portion 16a, which is the highest portion of the holding portion 15 in the vertical direction, is conveniently positioned at a higher position relative to the base portion 31 of the weather strip 30 related to the roof apparatus 1 including the weather strip 30 provided with the base portion 31 and the sealing portion 37 having the hollow configuration. Thus, the weather strip 30 is securely held by the holding portion 15.

According to this embodiment, the sealing portion 37 of the weather strip 30 includes the sealing portion body 38 positioned between the movable panel 20 and the base portion 31, and the extending portion 39 extending from the sealing portion body 38 so as to be in contact with the flange portion 42. The extending portion 39 is positioned higher than the base portion 31 in the vertical direction between the movable panel 20 and the flange portion 42. According to the above described structure, when the roof apparatus 1 is viewed from the outside of the roof apparatus 1, only the sealing portion 37 is visible between the flange portion 42 of the roof panel 40 and the movable panel 20. As a result, deterioration of an appearance of the weather strip 30, and eventually, an appearance of the roof apparatus 1, may be avoidable.

According to this embodiment, the guide rail 13 is adapted as the supporting member at which the holding portion 15 is provided. The guide rail 13 extends in the direction of the opening and closing operation of the movable panel 20, that is, in the front/rear direction of the vehicle so as to support the movable member 25 which drives and moves the movable panel 20 for opening and closing the opening portion A. Thus, the holding portion 15 holding the weather strip 30 that extends in the front/rear direction of the vehicle is readily provided by partly changing structures of the existing guide rails 13.

According to this embodiment, the front housing 11 and the rear housing 12 are adapted as the supporting members at which the holding portion 15 is provided. Each of the front housing 11 and the rear housing 12 extends in the direction perpendicular to the direction of the opening and closing operation of the movable panel 20 (the width direction of the vehicle) and connects the pair of guide rails 13, 13 with each other. Thus, the holding portion 15 holding the weather strip 30 that extends in the width direction of the vehicle is readily provided by partly changing structures of the existing front housing 11 and the rear housing 12.

According to this embodiment, a sealing effect between the movable panel 20 and the inner-side vertical wall portion 16 may be enhanced by means of the sealing portion body 38. In addition, the sealing effect between the base portion 31 and the flange portion 42 may be enhanced by means of the extending portion 39, the first and second inner-side protrusions 34a and 34b, the sealing agent and the outer-side protrusion 35. Furthermore, the sealing effect between the base portion 31 and the inner surface of the roof panel body 41 may be enhanced by means of the upper protrusion 36. Further, the sealing effect between the inner surface of the holding portion 15 and the base portion 31 may be enhanced because the holding portion 15 and the base portion 31 are in pressure contact with each other. Thus, an entry of water from a gap between the movable panel 20 and the roof panel 40 into an interior of the vehicle may be avoidable. This alleviates a need to provide a water discharge path for discharging water that is entering or has entered into the interior of the vehicle. Consequently, the structure of the roof apparatus 1 and eventually a structure of the vehicle may be simplified.

According to this embodiment, the inside of the base portion 31 is filled with the sealing agent in the state where the weather strip 30 is assembled on the guide rail 13. After the inside of the base portion 31 is filled with the sealing agent, the flange portion 42 is inserted and fitted into the inside of the base portion 31 from the opening of the base portion 31. Thus, the roof apparatus 1 is assembled on the roof panel 40. This allows the roof apparatus 1 to be shipped in the state where the weather strip 30 is assembled on, for example, any one of the guide rail 13, the front housing 11, the rear housing 12 or the like. Consequently, an assembly time is reduced compared to a manufacturing process where the weather strip 30 alone is assembled on the roof apparatus 1 in a production line of the vehicle, thereby simplifying the manufacturing process of the vehicle.

According to this embodiment, the first and second inner-side protrusions 34a and 34b are arranged while being apart from each other in the vertical direction. Furthermore, in this embodiment, the number of the inner-side protrusions 34a and 34b is set to be greater than the number of the outer-side protrusion 35 relative to the vertical direction. The length of the first and second inner-side protrusions 34a and 34b is shorter than the length of the outer-side protrusion 35 in the protruding direction. According to the above described structure, a degree of deflection of the first and second inner-side protrusions 34a and 34b becomes smaller than that of the outer-side protrusion 35. This stabilizes a posture of the sealing portion 37 relative to the flange portion 42, thereby properly improving a sealing performance of the weather strip 30.

Further, according to this embodiment, a smaller area of the weather strip 30 is exposed between the roof panel 40 and the movable panel 20 compared to a case that the number of the first and second inner-side protrusions 34a and 34b is set to be equal to or less than the number of the outer-side protrusion 35 relative to the vertical direction or a case that the length of the first and second inner-side protrusions 34a and 34b is formed to be longer than the length of the outer-side protrusion 35 in the protruding direction. This may contribute to improvement in a design, that is, an esthetic appearance of the roof apparatus 1.

Variations or changes may be made to the above-explained embodiment as follows. The roof apparatus 1 according to this embodiment includes no water discharge path for discharging the water that is entering or has entered into the interior of the vehicle from the gap between the movable panel 20 and the roof panel 40. However, the structure of the roof apparatus 1 is not limited thereto and the water discharge path may be provided.

According to this embodiment, the holding portion 15 that holds the weather strip 30 is formed by partly changing the structure of the front housing 11, the rear housing 12 and the guide rail 13, however, other structures than the front housing 11, the housing 12 or the guide rail 13 may be used as the supporting member as long as the supporting member is mounted on the roof panel 40 and supports the moveable panel 20 directly or indirectly.

According to this embodiment, the sealing portion 37 desirably includes the sealing portion body 38 which is positioned between the movable panel 20 and the base portion 31, and the extending portion 39 extending from the sealing portion body 38 so as to be positioned between the movable panel 20 and the flange portion 42 and to be in contact with the flange portion 42 at the higher position than the base portion 31 in the vertical direction in order to avoid the deterioration of the appearance of the weather strip 30, and eventually, the appearance of the roof apparatus. However, the extending portion 39 may be omitted from the sealing portion 37 in case that no consideration of the appearance of the roof apparatus 1 is necessary.

According to this embodiment, the lowermost end portion 38c, which is the lowest portion of the sealing portion 37, is desirably positioned lower than the upper end portion 16a, which is the highest portion of the inner-side vertical wall portion 16 in the vertical direction, in view that the upper end portion 16a, which is the highest portion of the holding portion 15 (the inner-side vertical wall portion 16), is conveniently positioned at the high position relative to the base portion 31. However, the configuration of the sealing portion 37 is not limited thereto. For example, the lowermost end portion 38c of the sealing portion body 38 may be positioned higher than the upper end portion 16a of the inner-side vertical wall portion 16 as long as the weather strip 30 is surely held in place by means of other configurations than the inner-side vertical wall portion 16.

According to this embodiment, the upper protrusion 36 is desirably provided at the base portion 31 in order to improve the sealing effect between the base portion 31 and the inner surface of the roof panel body 41. However, the upper protrusion 36 may be omitted from the weather strip 30 in case that the entry of the water into the interior of the vehicle is properly regulated by means of, for example, the first and second inner-side protrusions 34a, 34b or the outer-side protrusion 35.

Instead of the single outer-side protrusion 35 formed on the inner surface of the base portion 31, two outer-side protrusions may be provided in a manner similar to the forming of the first and second inner-side protrusions 34a and 34b as explained in this embodiment. Alternatively, three or more outer-side protrusions may be provided.

Instead of the two inner-side protrusions 34a and 34b formed on the inner surface of the base portion 31, one inner-side protrusion may be provided in a manner similar to the forming of the outer-side protrusion 35 as explained in this embodiment. Alternatively, three or more inner-side protrusions may be provided.

The length of the outer-side protrusion 35 may be set to be equal to or shorter than the length of the first and second inner-side protrusions 34a and 34b. According to this embodiment and the variations thereof, the protrusions are desirably formed on the inner surface of the base portion 31 so as to protrude toward the flange portion 42 of the roof panel 40 and to be in contact with the flange portion 42 in order to improve the sealing effect between the inner surface of the base portion 31 and the flange portion 42. However, the roof panel 1 according to this embodiment is not limited thereto. For example, the protrusions formed on the inner surface of the base portion 31 may be omitted and the inner surface of the base portion 31 may be formed to be in pressure contact with the flange portion 42 as long as the sealing effect is ensured between the inner surface of the base portion 31 and the flange portion 42 simply by providing the sealing agent therebetween. In this case, only the first and second inner-side protrusions 34a and 34b may be omitted, or only the outer-side protrusion 35 may be omitted.

According to this embodiment, the outer surface of the base portion 31 of the weather strip 30 is in pressure contact with the inner surface, which faces the outer surface of the base portion 31, of the holding portion 15 (the inner-side vertical wall portion 16 and the outer-side vertical wall portion 17) in order to enhance the sealing effect between the outer surface of the base portion 31 and the inner surface of the holding portion 15. However, the base portion 31 and the inner surface of the holding portion 15 are not necessarily to be in pressure contact with each other as long as the sealing portion 37 appropriately blocks the water from entering into the interior of the vehicle from the gap between the movable panel 20 and the roof panel 40 into the interior of the vehicle, in other words, in case that a necessity of the sealing effect between the outer surface of the base portion 31 and the inner surface of the holding portion 15 is not high.

According to this embodiment, a size or a length of the inner-side vertical wall portion 16 and the outer-side vertical wall portion 17 in the vertical direction is set to be the same level to each other. However, the size of either one of the inner-side vertical wall portion 16 and the outer-side vertical wall portion 17 in the vertical direction may be larger than that of the other one of the inner-side vertical wall portion 16 and the outer-side vertical wall portion 17.

According to this embodiment, as shown in FIG. 5, the inner-side vertical wall portion 16, the outer-side vertical wall portion 17, the base portion 31 of the weather strip 31 and the flange portion 42 are located at positions so as to substantially correspond to each other in the vertical direction, that is, the inner-side vertical wall portion 16, the outer-side vertical wall portion 17, the base portion 31 of the weather strip 31 and the flange portion 42 are overlapping with one another in the vertical direction. However, the configuration of the roof apparatus 1 according to this embodiment is not limited thereto. For example, the roof apparatus 1 may include a configuration where the inner-side and outer-side vertical wall portions 16, 17 and the base portion 31 of the weather strip 30 are overlapping with each other at a position in the vertical direction by forming either one of the inner-side vertical wall portion 16 and the outer-side vertical wall portion 17 to be smaller than the other one in the size in the vertical direction while, the inner-side and outer-side vertical wall portions 16, 17 and the flange portion 42 do not overlap with each other.

According to this embodiment, the holding portion 15 includes the inner-side vertical wall portion 16 and the outer-side vertical wall portion 17, however, the holding portion 15 of this embodiment is not limited thereto. The holding portion may include either one of the inner-side vertical wall portion 16 and the outer-side vertical wall portion 17.

In essence, any suitable member mounted on the roof panel 40 for supporting the movable panel 20 may be adapted as the supporting member. Any portion provided at the supporting member for holding the base portion 31 of the weather strip 30 may be adapted as the holding portion.

According to this embodiment, the roof apparatus 1 includes the movable panel 20 for opening and closing the opening portion A adapted to be provided on the roof panel 40, and the weather strip 30 disposed between the outer surface 42a of the roof panel 40 and the movable panel 20 so as to serve as the sealing between the outer surface 42a and the movable panel 20. The outer surface 42a of the roof panel 40 includes the flange portion 42 formed to extend vertically downward from the roof panel body 41 of the roof panel 40. The weather strip 30 includes the base portion 31 accommodating the flange portion 42 of the roof panel 40 inside the base portion 31. The front housing 11, the rear housing 12 and the guide rail 13 mounted on the roof panel 40 and supporting the movable panel 20 include the holding portion 15 holding the base portion 31 of the weather strip 30.

According to the above described structure, the weather strip 30 is assembled in the state where the base portion 31 accommodates therein the flange portion 42 of the roof panel 40 and that the weather strip 30 is held inside the holding portion 15 provided at the front housing 11, the rear housing 12 and the guide rail 13. Thus, unlike the structure where for example the flange portion of the roof panel is simply sandwiched by the base portion 31, the weather strip 30 is securely held by the holding portion 15 after being assembled. Consequently, the reliability of the weather strip 30, which is provided to the roof apparatus 1 whose opening edge of the roof panel 40 includes the flange 42 extending from the roof panel body 41 downward in the vertical direction, may be enhanced.

According to this embodiment, the holding portion 15 includes at least one of the inner-side vertical wall portion 16 extending in the vertical direction and positioned inward toward the roof apparatus 1 relative to the flange portion 42 and the outer-side vertical wall portion 17 extending in the vertical direction and positioned outward toward the roof apparatus 1 relative to the flange portion 42. The base portion 31 of the weather strip 30 is held between the flange portion 42 and at least one of the inner-side vertical wall portion 16 and the outer-side vertical wall portion 17 in a manner that the weather strip 30 is sandwiched between the flange portion 42 and at least one of the inner-side vertical wall portion 16 and the outer-side vertical wall portion 17.

According to the above described structure, the base portion 31 is held by the flange portion 42 and at least one of the inner-side vertical wall portion 16 and the outer-side vertical wall portion 17. Thus, the weather strip 30 is even more securely held after being assembled, thereby enhancing the reliability of the weather strip 30. The holding portion 15 desirably includes the inner-side vertical wall portion 16 and the outer-side vertical wall portion 17. This allows the front housing 11, the rear housing 12, the guide rail 13 and the weather strip 30 to be assembled on the roof panel 40 in the state where the inner-side vertical wall portion 16 and the outer-side vertical wall portion 17, both of which constitute the front housing 11, the rear housing 12 and the guide rail 13, hold therebetween the base portion 31 of the weather strip 30. Consequently, an assemblability or an assembly performance may be improved compared to the manufacturing process where the weather strip 30 is assembled independently from the front housing 11, the rear housing 12 and the guide rail 13 on the roof apparatus 1 in the production line of the vehicle, thereby simplifying the manufacturing process of the vehicle.

According to this embodiment, the outer surface of the base portion 31 of the weather strip 30 is in pressure contact with the holding portion 15 which faces the outer surface of the base portion 31 of the weather strip 30.

According to the above described structure, the weather strip 30 is even more securely held by the holding portion 15 after being assembled. In addition, the outer surface of the base portion 31 of the weather strip 30 is in pressure contact with the inner surface of the holding portion 15 opposing the outer surface of the base portion 31, and thus the sealing effect between the outer surface of the base portion 31 and the holding portion 15 may be improved.

According to this embodiment, the protrusion 34a, 34b, 35 is formed at the inner surface of the base portion 31 of the weather strip 30. The protrusion 34a, 34b, 35 protrudes toward the flange portion 42 of the roof panel 40 so as to be in contact with the flange portion 42.

According to the above described structure, the protrusion 34a, 34b, 35 formed on the base portion 31 of the weather strip 30 is maintained in pressure contact with the flange portion 42 of the roof panel 40, and thus the sealing effect between the inner surface of the base portion 31 and the flange portion 42 may be enhanced.

According to this embodiment, the weather strip 30 includes the sealing portion 37 formed into the hollow configuration and formed integrally with the base portion 31 so as to be in contact with the movable panel 20 at least when the movable panel 20 is in the fully closed position, and the protrusion 34a, 34b, 35 includes the inner-side protrusion 34a, 34b positioned inwardly of the roof apparatus 1 relative to the flange portion 42 and the outer-side protrusion 35 positioned outwardly of the roof apparatus 1 relative to the flange portion 42.

According to the above described structure, the inner-side protrusion 34a, 34b and the outer-side protrusion 35 are formed on the inner surface of the base portion 31, and thus the sealing effect between the inner surface of the base portion 31 and the flange portion 42 may be further improved when comparing to a structure where either one of the inner-side protrusion 34a, 34b and the outer-side protrusion 35 is formed.

According to this embodiment, the inner-side protrusion 34a, 34b includes the plural inner-side protrusions 34a, 34b formed to be in parallel with each other in the vertical direction, and the number of the plural inner-side protrusions 34a, 34b relative to the vertical direction is greater than the number of the outer-side protrusion 35 relative to the vertical direction.

According to this embodiment, the length of the inner-side protrusion 34a, 34b in the direction in which the inner-side protrusion 34a, 34b protrudes is formed to be shorter than the length of the outer-side protrusion 35 in the direction in which the outer-side protrusion 35 protrudes.

According to the above described structure, the degree of deflection of the inner-side protrusions 34a and 34b, for example, the first inner-side protrusion 34a and the second inner-side protrusion 34b, may become smaller than that of the outer-side protrusion 35. This stabilizes the posture of the sealing portion 37 relative to the flange portion 42, thereby properly improving the sealing performance of the weather strip 30. In addition, the smaller area of the weather strip 30 is exposed between the roof panel 40 and the movable panel 20 compared to a case that the number of the inner-side protrusions 34a and 34b is equal to or less than the number of the outer-side protrusion 35 relative to the vertical direction or a case that the length of the inner-side protrusions 34a and 34b is shorter than the length of the outer-side protrusion 35 in the protruding direction. This contributes to improvement in a design, that is, an esthetic appearance of the roof apparatus 1.

According to this embodiment, the protrusion 36 is formed at the base portion 31 of the weather strip 30, and the protrusion 36 protrudes toward the inner surface of the roof panel body 41 so as to be in contact with the inner surface of the roof panel body 41.

According to the above described structure, the sealing effect between the base portion 31 of the weather strip 30 and the inner surface of the roof panel body 41 may be improved by maintaining the upper protrusion 36 formed at the base portion 31 in contact with the inner surface of the roof panel body 41.

In case that the roof panel body 41 is constituted by a single panel, the roof panel body 41 serves as the panel. On the other hand, in case that the roof panel body 41 is constituted by plural panels overlaid on each other or in case that the roof panel body 41 includes a reinforcement member in addition to the panel, all these panels and the reinforcement member serve as the roof panel body.

According to this embodiment, the weather strip 30 includes the sealing portion 37 formed into the hollow configuration and formed integrally with the base portion 31 so as to be in contact with the movable panel 20 at least when the movable panel 20 is in the fully closed position, and the sealing portion 37 is provided in a manner that the first portion 38c of the sealing portion 37, which is positioned at a lowest position in the sealing portion 37 in the vertical direction, is located lower than the second portion 16a, 17a of the holding portion 15 of the front housing 11, the rear housing 12 and the guide rail 13, which is positioned at the highest position relative to the holding portion 15 in the vertical direction, between the sealing portion 37 and the base portion 31.

According to the above described structure, in case that the roof apparatus 1 includes the weather strip 30 provided with the base portion 31 and the sealing portion 37 formed into the hollow configuration, the second portion 16a, 17a of the holding portion 15 is conveniently positioned higher relative to the base portion 31. Thus, the weather strip 30 is even more securely held by the holding portion 15.

According to this embodiment, the sealing portion 37 of the weather strip 30 includes the sealing portion body 38 positioned between the movable panel 20 and the base portion 31, and the extending portion 39 extending from the sealing portion body 38 and being positioned higher than the base portion 31 in the vertical direction between the movable panel 20 and the flange portion 42 so as to be in contact with the flange portion 42.

According to the above described structure, when the roof apparatus 1 is viewed from the outside of the roof apparatus 1, only the sealing portion 37 is visible between the flange portion 42 of the roof panel 40 and the movable panel 20. Therefore, the deterioration of the appearance of the weather strip 30, and eventually, the appearance of the roof apparatus 1 may be avoided even in case that the base portion 31 and the sealing portion 37, both of which constitute the weather strip 30, are made in the dual molding process so as to have different colors between the base portion 31 and the sealing portion 37.

According to this embodiment, the roof apparatus 1 includes the guide rail 13 extending in the direction in which the movable panel 20 moves to open and close the opening portion A of the roof panel 40 and supporting the movable member 25 for moving the movable panel 20 in a manner that the movable member 25 is movable relative to the guide rail 13, where the supporting member 11, 12, 13 includes the guide rail 13.

According to the above described structure, the holding portion 15 holding the weather strip 30 that extends in the direction of the opening and closing operation of the movable panel 20, may be readily achieved by partly changing the structure of the existing guide rail 13.

According to this embodiment, the roof apparatus 1 includes the pair of guide rails 13, 13 extending in the direction in which the movable panel 20 moves to open and close the opening portion A of the roof panel 40 and supporting the movable member 25 for moving the movable panel 20 in a manner that the movable member 25 is movable relative to the pair of the guide rails 13, 13 and the front housing 11 and the rear housing 12 extending in the direction perpendicular to the direction in which the movable panel 20 moves and connecting the pair of guide rails 13, 13 to each other, where the supporting member 11, 12, 13 includes the connecting member 11, 12.

According to the above described structure, the holding portion 15 holding the weather strip 30 that extends in the perpendicular direction to the direction of the opening and closing operation of the movable panel 20, may be readily achieved by partly changing the structures of the existing front housing 11 and the rear housing 12.

According to this embodiment, the projection 32c is formed on one of the weather strip 30 and the holding portion 15 and the cut-out portion 17c is formed on the other one of the weather strip 30 and the holding portion 15, and the projection 32c is fittedly engaged with the cut-out portion 17c.

According to the above described structure, the projection 32c is fittedly engaged with the cut-out portion 17c and thus the base portion 31 of the weather strip 30 is securely held by the holding portion 15.

According to this embodiment, the roof apparatus 1, in which the outer surface 42a of the roof panel 40 includes the flange portion 42 extending vertically downward from the roof panel body 41 and which enhances the reliability of the weather strip 30, may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus, comprising:
a movable panel for opening and closing an opening portion adapted to be provided on a roof panel; and
a weather strip disposed between an opening edge of the roof panel and the movable panel so as to serve as a sealing between the opening edge and the movable panel, the opening edge of the roof panel including a flange portion formed to extend vertically downward from a roof panel body of the roof panel, wherein:
the weather strip includes a base portion accommodating the flange portion of the roof panel inside the base portion and a supporting member mounted on the roof panel and supporting the movable panel includes a holding portion holding the base portion of the weather strip,
the holding portion includes at least one of an inner-side vertical wall portion extending in a vertical direction and positioned inward toward the roof apparatus relative to the flange portion and an outer-side vertical wall portion extending in the vertical direction and positioned outward toward the roof apparatus relative to the flange portion, and
the base portion of the weather strip is held between the flange portion and at least one of the inner-side vertical wall portion and the outer-side vertical wall portion in a manner that the weather strip is sandwiched between the flange portion and at least one of the inner-side vertical wall portion and the outer-side vertical wall portion.

2. The roof apparatus according to claim 1, wherein an outer surface of the base portion of the weather strip is in pressure contact with the holding portion which faces the outer surface of the base portion of the weather strip.

3. The roof apparatus according to claim 1, wherein a protrusion is formed at an inner surface of the base portion of the weather strip, the protrusion protrudes toward the flange portion of the roof panel so as to be in contact with the flange portion.

4. The roof apparatus according to claim 3, wherein the weather strip includes a sealing portion formed into a hollow configuration and formed integrally with the base portion so as to be in contact with the movable panel at least when the movable panel is in a fully closed position, and the protrusion includes an inner-side protrusion positioned inwardly of the roof apparatus relative to the flange portion and an outer-side protrusion positioned outwardly of the roof apparatus relative to the flange portion.

5. The roof apparatus according to claim 4, wherein the inner-side protrusion includes a plurality of inner-side protrusions formed to be in parallel with each other in the vertical direction, and a number of the plurality of the inner-side protrusions relative to the vertical direction being greater than a number of the outer-side protrusion relative to the vertical direction.

6. The roof apparatus according to claim 4, wherein a length of the inner-side protrusion in a direction in which the inner-side protrusion protrude is formed to be shorter than a length of the outer-side protrusion in a direction in which the outer-side protrusion protrudes.

7. The roof apparatus according to claim 1, wherein a protrusion is formed at the base portion of the weather strip, and the protrusion protrudes toward an inner surface of the roof panel body so as to be in contact with the inner surface of the roof panel body.

8. The roof apparatus according to claim 1, wherein
the weather strip includes the sealing portion formed into a hollow configuration and formed integrally with the base portion so as to be in contact with the movable panel at least when the movable panel is in a fully closed position, and
the sealing portion is provided in a manner that a first portion of the sealing portion, which is positioned at a lowest position in the sealing portion in the vertical direction, is located lower than a second portion of the holding portion of the supporting member, which is positioned at a highest position relative to the holding portion in the vertical direction, between the sealing portion and the base portion.

9. The roof apparatus according to claim 8, wherein the sealing portion of the weather strip includes a sealing portion body positioned between the movable panel and the base portion, and an extending portion extending from the sealing portion body and being positioned higher than the base portion in the vertical direction between the movable panel and the flange portion so as to be in contact with the flange portion.

10. A roof apparatus comprising:
a movable panel for opening and closing an opening portion adapted to be provided on a roof panel;
a weather strip disposed between an opening edge of the roof panel and the movable panel so as to serve as a sealing between the opening edge and the movable panel, the opening edge of the roof panel including a flange portion formed to extend vertically downward from a roof panel body of the roof panel, wherein
the weather strip includes a base portion accommodating the flange portion of the roof panel inside the base portion and a supporting member mounted on the roof panel and supporting the movable panel includes a holding portion holding the base portion of the weather strip; and
a guide rail extending in a direction in which the movable panel moves to open and close the opening portion of the roof panel and supporting a movable member for moving the movable panel in a manner that the movable member is movable relative to the guide rail, wherein the supporting member includes the guide rail.

11. A roof apparatus comprising:
a movable panel for opening and closing an opening portion adapted to be provided on a roof panel;
a weather strip disposed between an opening edge of the roof panel and the movable panel so as to serve as a sealing between the opening edge and the movable panel, the opening edge of the roof panel including a flange portion formed to extend vertically downward from a roof panel body of the roof panel, wherein
the weather strip includes a base portion accommodating the flange portion of the roof panel inside the base portion and a supporting member mounted on the roof panel and supporting the movable panel includes a holding portion holding the base portion of the weather strip;
a pair of guide rails extending in a direction in which the movable panel moves to open and close the opening portion of the roof panel and supporting a movable member for moving the movable panel in a manner that the movable member is movable relative to the pair of the guide rails; and a connecting member extending in a direction perpendicular to the direction in which the movable panel moves and connecting the pair of guide rails to each other, wherein the supporting member includes the connecting member.

12. The roof apparatus according to claim 1, wherein
a fitting member is formed on one of the weather strip and the holding portion and a receiving member is formed on the other one of the weather strip and the holding portion, and the fitting member is fittedly engaged with the receiving member.

* * * * *